US012578706B2

(12) United States Patent (10) Patent No.: US 12,578,706 B2

Taki et al. (45) Date of Patent: Mar. 17, 2026

(54) CONTROL SYSTEM, INDUSTRIAL DEVICE, CONTROL METHOD, AND PROGRAM

(71) Applicant: KABUSHIKI KAISHA YASKAWA DENKI, Kitakyushu (JP)

(72) Inventors: Naoya Taki, Kitakyushu (JP); Koji Inoue, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 431 days.

(21) Appl. No.: 18/053,486

(22) Filed: Nov. 8, 2022

(65) Prior Publication Data

US 2023/0152783 A1 May 18, 2023

(30) Foreign Application Priority Data

Nov. 12, 2021 (JP) ................................. 2021-184718

(51) Int. Cl.
 *G05B 19/4155* (2006.01)
(52) U.S. Cl.
 CPC .................... *G05B 19/4155* (2013.01); *G05B 2219/31103* (2013.01)
(58) Field of Classification Search
 None
 See application file for complete search history.

(56) References Cited

U.S. PATENT DOCUMENTS 10,230,717 B2 *  3/2019  Main ........................ H04W 4/02
10,491,569 B1 *  11/2019  Powell, III .......... H04L 61/2596

10,791,091 B1 *  9/2020  Sanders .............. H04L 63/0485
10,924,347 B1 *  2/2021  Narsian ................... H04L 67/10
11,200,345 B2 *  12/2021  Lillibridge .............. G06F 21/74
(Continued)

FOREIGN PATENT DOCUMENTS

EP      2 658 204 A1     10/2013
JP      2020-057064 A     4/2020
(Continued)

OTHER PUBLICATIONS

Combined Chinese Office Action and Search Report issued Jul. 25, 2024 in Chinese Application No. 202211285888.9 with English translation, 23 pgs.

(Continued)

*Primary Examiner* — Hua Lu

(74) *Attorney, Agent, or Firm* — Oblon, McClelland, Maier & Neustadt, L.L.P.

(57) ABSTRACT

A control system includes multiple industrial devices each belonging to one or more communication domains of multiple communication domains set in the same industrial communication network such that industrial devices belonging to the same communication domain communicate with each other. One or more industrial devices of the industrial devices include processing circuitry that stores domain information indicating whether or not the one or more communication domains to which the one or more industrial devices belong is a secure domain in which secure communication is performed, performs security processing related to the secure communication when the domain information indicates the secure domain, and performs the secure communication based on the security processing.

20 Claims, 12 Drawing Sheets

(56) References Cited

U.S. PATENT DOCUMENTS

| | | | | | |
|---|---|---|---|---|---|
| 2003/0065944 | A1* | 4/2003 | Mao | | H04L 63/04 |
| | | | | | 709/229 |
| 2004/0105298 | A1* | 6/2004 | Symes | | G06F 9/4812 |
| | | | | | 714/E11.207 |
| 2004/0158736 | A1* | 8/2004 | Watt | | G06F 21/74 |
| | | | | | 713/166 |
| 2004/0260910 | A1* | 12/2004 | Watt | | G06F 21/74 |
| | | | | | 712/229 |
| 2005/0114616 | A1* | 5/2005 | Tune | | G06F 12/1441 |
| | | | | | 711/163 |
| 2008/0005794 | A1* | 1/2008 | Inoue | | G06F 21/56 |
| | | | | | 726/22 |
| 2009/0119541 | A1* | 5/2009 | Inoue | | G06F 11/2028 |
| | | | | | 714/10 |
| 2009/0320048 | A1* | 12/2009 | Watt | | G06F 9/526 |
| | | | | | 718/100 |
| 2013/0205403 | A1* | 8/2013 | Grocutt | | G06F 21/52 |
| | | | | | 726/27 |
| 2014/0075581 | A1* | 3/2014 | Grocutt | | G06F 21/554 |
| | | | | | 726/30 |
| 2014/0096183 | A1* | 4/2014 | Jain | | H04L 12/4633 |
| | | | | | 726/1 |
| 2014/0165216 | A1* | 6/2014 | Kwag | | G06F 21/74 |
| | | | | | 726/30 |
| 2015/0017945 | A1* | 1/2015 | Eckler | | H04W 8/20 |
| | | | | | 455/414.1 |
| 2015/0106913 | A1* | 4/2015 | Wang | | H04L 12/4625 |
| | | | | | 726/13 |
| 2017/0337384 | A1* | 11/2017 | Willemse | | H04L 9/3213 |
| 2018/0203818 | A1* | 7/2018 | Fukuda | | G05B 15/02 |
| 2020/0225643 | A1* | 7/2020 | Tugbo | | G05B 19/4155 |
| 2021/0065082 | A1* | 3/2021 | Terayama | | G06Q 10/06312 |
| 2021/0117242 | A1* | 4/2021 | Van De Groenendaal | | |
| | | | | | H04L 67/1001 |
| 2021/0224380 | A1* | 7/2021 | Grocutt | | G06F 9/3861 |
| 2021/0325855 | A1* | 10/2021 | Wouhaybi | | G05B 19/4155 |
| 2022/0107625 | A1* | 4/2022 | Chin | | B25J 5/007 |
| 2022/0129542 | A1* | 4/2022 | Sun | | G06F 21/53 |
| 2022/0377069 | A1* | 11/2022 | Smith | | H04L 63/0876 |
| 2025/0036575 | A1* | 1/2025 | Parker | | G06F 12/1441 |

FOREIGN PATENT DOCUMENTS

| | | | | |
|---|---|---|---|---|
| WO | WO 2017/046916 A1 | 3/2017 | | |
| WO | WO-2020180298 A1 * | 9/2020 | | G06F 21/74 |

OTHER PUBLICATIONS

Combined Chinese Office Action and Search Report issued Nov. 30, 2024 in Chinese Patent Application No. 202211285888.9 (with English translation), 25 pages.

Office Action dated Feb. 5, 2025, issued in corresponding Chinese patent application No. 202211285888.9 (with English translation).

* cited by examiner

FIG. 5

| Communication domain name | Type | First industrial device | Second industrial device | Schedule |
|---|---|---|---|---|
| Communication domain (D1) | Normal domain | 10A | 10B,10C,10D,10E,10F | Schedule 1 |
| Communication domain (D2) | Secure domain | 10D | 10E,10F | Schedule 2 |

FIG. 6

| |
|---|
| Preamble |
| Delimiter |
| Overall header |
| Individual header 1 |
| Secure PDU1 |
| Individual header 2 |
| Secure PDU2 |
| . . . |
| Individual header n |
| Secure PDUn |
| Overall CRC |

FIG. 11

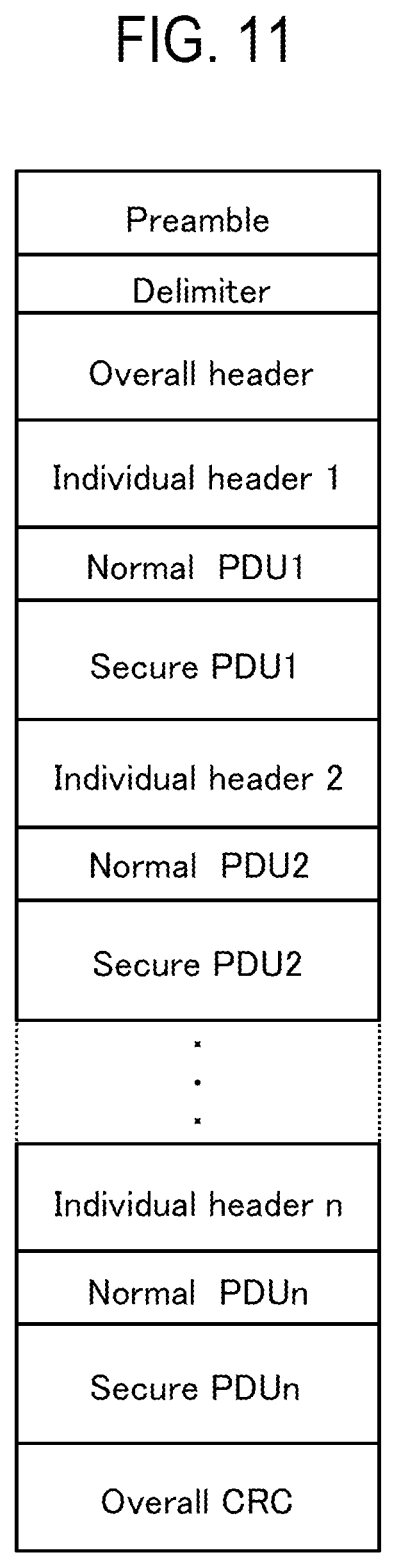

| |
|---|
| Preamble |
| Delimiter |
| Overall header |
| Individual header 1 |
| Normal  PDU1 |
| Secure PDU1 |
| Individual header 2 |
| Normal  PDU2 |
| Secure PDU2 |
| . . . |
| Individual header n |
| Normal  PDUn |
| Secure PDUn |
| Overall CRC |

CONTROL SYSTEM, INDUSTRIAL DEVICE, CONTROL METHOD, AND PROGRAM

CROSS-REFERENCE TO RELATED APPLICATIONS

The present application is based upon and claims the benefit of priority to Japanese Patent Application No. 2021-184718, filed Nov. 12, 2021, the entire contents of which are incorporated herein by reference.

BACKGROUND OF THE INVENTION

Field of the Invention

The present invention relates to a control system, an industrial device, a control method, and a program.

Description of Background Art

International Publication No. 2017/046916 describes a technology for dynamically switching communication groups within a communication system within one transmission period by controlling ON/OFF of each of switches for causing one communication group to perform communication independently from other communication groups. The entire contents of this publication are incorporated herein by reference.

SUMMARY OF THE INVENTION

According to one aspect of the present invention, a control system includes multiple industrial devices each belonging to one or more communication domains of multiple communication domains set in the same industrial communication network such that industrial devices belonging to the same communication domain communicate with each other. One or more industrial devices of the industrial devices include processing circuitry that stores domain information indicating whether or not the one or more communication domains to which the one or more industrial devices belong is a secure domain in which secure communication is performed, performs security processing related to the secure communication when the domain information indicates the secure domain, and performs the secure communication based on the security processing.

According to another aspect of the present invention, an industrial device includes processing circuitry that performs security processing related to secure communication when domain information indicates a secure domain in which the secure communication is performed, and performs the secure communication based on the security processing. The industrial device is one of multiple industrial devices each belonging to one or more communication domains of multiple communication domains set in the same industrial communication network such that industrial devices belonging to the same communication domain communicate with each other, and the domain information indicates whether or not the one or more communication domains to which the industrial device belongs is the secure domain.

According to yet another aspect of the present invention, a method for controlling an industrial device includes performing security processing related to secure communication when domain information indicates a secure domain in which the secure communication is performed, and performing the secure communication based on the security processing. The industrial device is one of multiple industrial devices each belonging to one or more communication domains of multiple communication domains set in the same industrial communication network such that industrial devices belonging to the same communication domain communicate with each other, and the domain information indicates whether or not the one or more communication domains to which the industrial device belongs is the secure domain.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 illustrates an example of domain information according to an embodiment of the present invention;

FIG. 6 illustrates an example of data that has been subjected to security processing according to an embodiment of the present invention;

FIG. 11 illustrates an example of data that has been subjected to security processing in a third modified embodiment of the present invention.

DETAILED DESCRIPTION OF THE EMBODIMENTS

Figure 1:
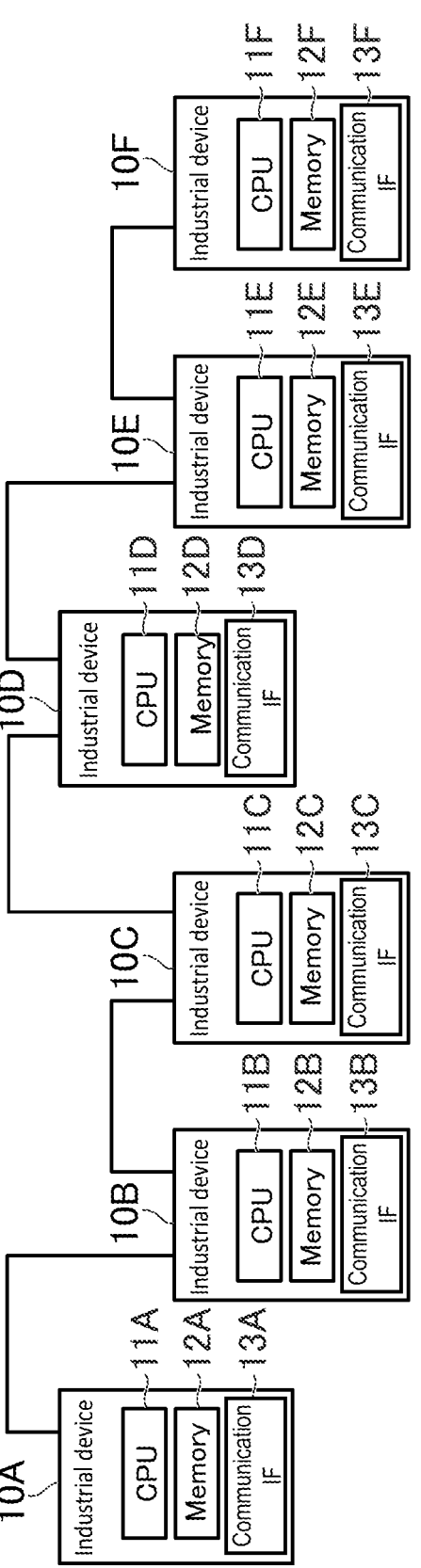
FIG. 1 illustrates an example of an overall structure of a control system according to an embodiment of the present invention.

Embodiments will now be described with reference to the accompanying drawings, wherein like reference numerals designate corresponding or identical elements throughout the various drawings.

Overall Structure of Control System

An example of a control system according to an embodiment of the present invention is described. FIG. 1 illustrates an example of an overall structure of the control system. In the present embodiment, when no distinction is made, each of industrial devices (10A-10F) is described as an industrial device 10. When no distinction is made, each of CPUs (11A-11F) is described as a CPU 11, each of memories (12A-12F) is described as a memory 12, and each of communication IFs (13A-13F) is described as a communication IF 13.

Each of the industrial devices 10 is a device positioned at a production site. For example, each of the industrial devices 10 is a device that performs a physical work, a device that controls a device that performs a physical work, or a device that collects data from these devices. Each of the industrial devices 10 may be of any type, for example, a motor control device, a numerical control device, a processing device, a carrying device, an inspection device, a controller that controls these devices, a robot controller, a PLC (Programmable Logic Controller), a cell controller, or a line controller. It is also possible that a device such as a sensor unit or an I/O unit that does not perform a physical work corresponds to an industrial device 10.

Each of the CPUs 11 includes one or more processors. Each of the memories 12 includes at least one of a volatile memory and a non-volatile memory. Each of the communication IFs 13 includes at least one of a communication interface for wired communication and a communication interface for wireless communication. Lines connecting the industrial devices 10 in FIG. 1 are communication cables. In the present embodiment, a case is described as an example where a connection form of the industrial devices 10 is daisy chain connection (cascade connection). However, the connection form of the industrial devices 10 may be any connection form such as star connection, and is not limited to daisy chain connection.

A hardware structure of each of the industrial devices 10 can be any structure and is not limited to that in the example in FIG. 1. For example, each of the industrial devices 10 may include a reading part such as a memory card slot, or an input-output part such as a USB terminal. In this case, a program or data stored in a computer-readable information storage medium may be supplied to the each of the industrial devices 10 via the reading part or the input-output part. For example, a program or data may be supplied to the industrial devices 10 via a network.

Further, each of the industrial devices 10 may also include other circuits such as an FPGA or an ASIC. In the present embodiment, a case is described where the CPUs 11 each correspond to a structure called a circuitry. However, other circuits such as an FPGA or an ASIC may correspond to a circuitry. For example, to each of the industrial devices 10, a mechanism such as a motor or a robot may be connected, or a sensor such as a torque sensor, a motor encoder, or a vision sensor may be connected.

Overview of Control System

A control system 1 of the present embodiment includes multiple communication domains set in the same industrial communication network. The industrial communication network is a network constructed based on an industrial communication protocol. The communication cables, which connect the industrial devices 10 to each other, and the communication IFs 13 conform to the industrial communication protocol. In the present embodiment, a case where the communication protocol is Mechatrolink (registered trademark) is described as an example. However, the communication protocol of the control system 1 may be any communication protocol and is not limited to the example in the present embodiment.

A communication domain is a communication range in a network. Communication is performed between devices belonging to the same communication domain. A communication domain is a logical group rather than a physical group. Communication is not performed between devices that do not belong to the same communication domain even when the devices are physically connected to each other. The control system 1 of the present embodiment supports multi-domain and includes multiple communication domains. Multi-domain refers to forming multiple communication domains within the same network.

In the present embodiment, a first industrial device and a second industrial device controlled by the first industrial device belong to each of the multiple communication domains. The first industrial device is a device that transmits a command to the second industrial device. The first industrial device may be referred to as a main device or a host device. The second industrial device is a device controlled by the first industrial device. The second industrial device is a device that operates based on a command from the first industrial device and transmits a response to the first industrial device. The second industrial device may be referred to as a secondary device or a client device. Where the first industrial device and the second industrial device are described, the reference numeral symbol "10" in the "industrial device 10" is omitted.

Figure 2:
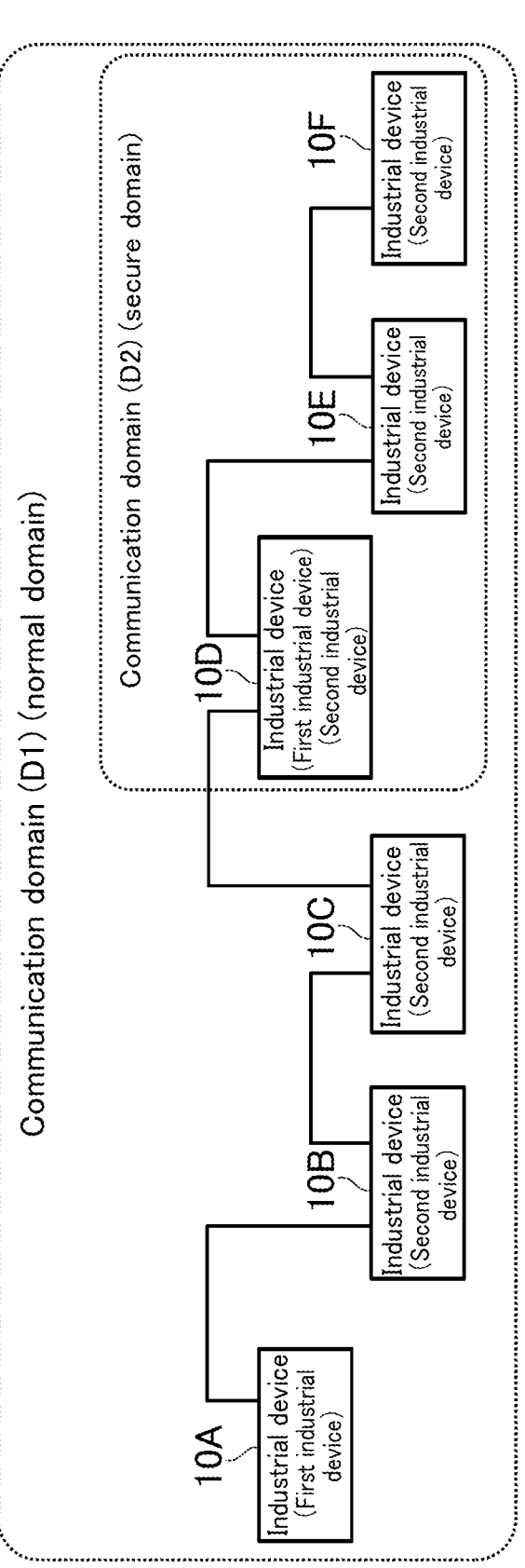
FIG. 2 illustrates an example of communication domains in a control system according to an embodiment of the present invention.

FIG. 2 illustrates an example of communication domains in the control system 1. In the present embodiment, the control system 1 includes a communication domain (D1), which is a normal domain, and a communication domain (D2), which is secure domain. In the following, when no distinction is made, each of the communication domains (D1, D2) is described as a communication domain (D). It is also possible that the control system 1 includes 3 or more communication domains (D), and the communication domains (D) are not limited to those in the example of FIG. 2.

A normal domain is a communication domain (D) in which normal communication is performed. The normal communication is communication in which security processing to be described later is not performed with respect to data to be transmitted. For example, in the normal communication, processing when there is no abnormality in the network and processing when there is an abnormality in the network are the same. For example, in secure communication, when there is no abnormality in the network, any command can be transmitted. However, when there is an abnormality in the network, a predetermined command is forcibly transmitted. On the other hand, in the normal communication, even when there is an abnormality in the network, rather than a predetermined command, any command same as that when there is no abnormality in the network can be transmitted. Since the security processing is not performed, the normal communication may be more difficult to respond to an abnormality occurring in the network than the secure communication. However, in the normal communication, since the security processing is not performed, time required for transmitting data may be reduced, or a processing load of the industrial devices 10 may be reduced.

A secure domain is a communication domain (D) in which secure communication is performed. The secure communication is communication in which the security processing is performed with respect to data to be transmitted. The security processing is processing for detecting an abnormality in the network with a certain or higher probability (higher probability than that in the normal communication) when the abnormality occurs. The security processing can be processing for reducing a possibility that communication is continued without being able to detect an abnormality even when communication has been interrupted due to missing data or a transmission error, or even when incorrect data has been transmitted. The security processing can also be processing for putting the network into a fail-safe state.

For example, in the secure communication, the processing when there is no abnormality in the network and the processing when there is an abnormality in the network may be different from each other. Since the security processing is performed, the secure communication can more easily respond to an abnormality occurring in the network than the normal communication. In the present embodiment, a case is described where a secure communication mechanism (secure communication module) exists on the premise of a normal communication mechanism (normal communication module). However, the normal communication and the secure communication may be different mechanisms from each other.

For example, the security processing may be processing that adds an error detection code with a larger code size (more bits) than an error detection code added in the normal communication. The security processing may be processing that adds more error detection codes than the normal communication. When no error detection code is added in the normal communication, the security processing may be processing that adds an error detection code.

Since an error correction code also can detect an error, an error detection code in the present embodiment has a meaning that also includes an error correction code. In the present embodiment, CRC (Cyclic Redundancy Check) is described as an example of an error detection code. However, without being limited to CRC, any type of error detection code can be applied. For example, as an error detection code, a parity code or a checksum may be used, or a Hamming code, which is also capable of error correction, may be used.

For example, when data multiplexing is not performed in the normal communication, the security processing may be processing that performs data multiplexing. When data multiplexing is performed in the normal communication, the security processing may be processing that performs more multiplexing than the normal communication. For example, when data duplexing is performed in the normal communication, performing data multiplexing at a level of triplexing or higher may correspond to the security processing.

For example, when an abnormality has occurred in the network, the security processing may be processing that prevents the industrial devices 10 from performing a specific operation. This processing may be processing that sets a specific command indicating not to perform any operation as a command for the industrial devices 10. The security processing may be a combination of the above-described types of processing. The security processing may be any processing that can respond to an abnormality occurring in the network, and is not limited to the examples of the present embodiment.

In the example of FIG. 2, all of the industrial devices (10A-10F) belong to the communication domain (D1), which is a normal domain. In the present embodiment, the industrial device (10A) controls each of the industrial devices (10B-10F). Therefore, the industrial device (10A) corresponds to the first industrial device in the communication domain (D1). The industrial devices (10B-10F) correspond to the second industrial devices in the communication domain (D1).

The industrial device (10A) does not need to control all the industrial devices (10B-10F) belonging to the same communication domain (D1), but may control only some of the industrial devices (10B-10F). For example, the industrial device (10A) may control only the industrial devices (10B-10E) and collect data from the industrial device (10F)

without controlling the industrial device (10F). Further, for example, the industrial device (10A) may control only the industrial devices (10B, 10C, 10E, 10F), and the industrial device (10D) may only perform data forwarding between the industrial device (10A) and the industrial devices (10E, 10F).

For example, the industrial devices (10D-10F) belong to the communication domain (D2). In the present embodiment, the industrial device (10D) controls each of the industrial devices (10E, 10F). Therefore, the industrial device (10D) corresponds to the first industrial device in the communication domain (D2). The industrial devices (10E, 10F) correspond to the second industrial devices in the communication domain (D2). Similar to the communication domain (D1), the industrial device (10D) may control some but not all of the industrial devices (10E, 10F).

In the present embodiment, periodic communication is performed in each of the communication domains (D1, D2). Periodic communication is a communication method in which communication is periodically performed. In periodic communication, when a certain transmission period arrives, communication is performed based on a predetermined procedure within this transmission period. When a certain transmission period ends and the next transmission period arrives, communication is performed again based on the same procedure. After that, communication based on the procedure, which is predetermined, is periodically repeated.

Figure 3:
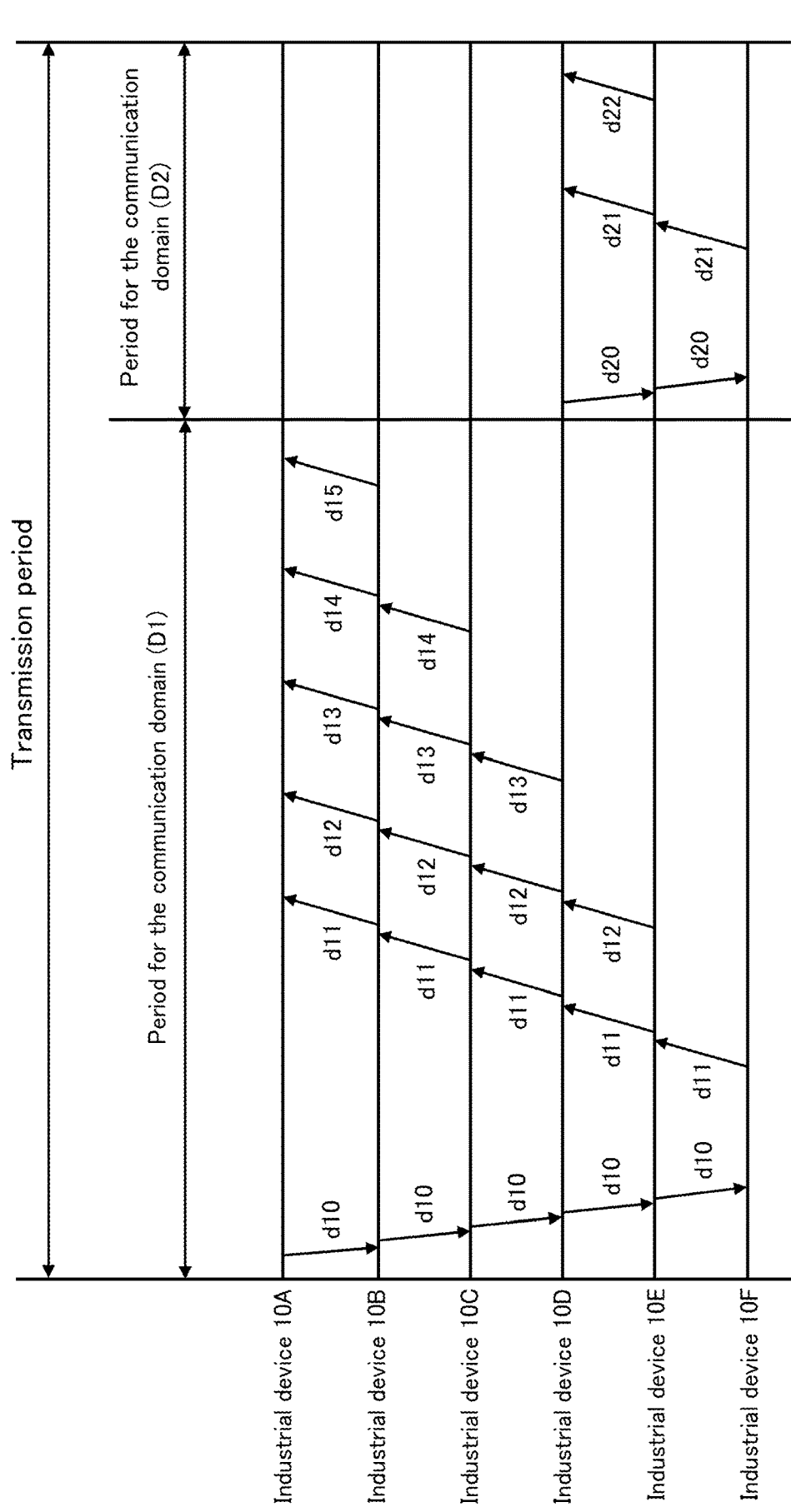
FIG. 3 illustrates an example of a communication procedure in a transmission period according to an embodiment of the present invention.

FIG. 3 illustrates an example of the communication procedure in a transmission period. In the present embodiment, a case is described as an example in which the transmission period of the communication domain (D1) and the transmission period of the communication domain (D2) are the same. However, these transmission periods may be different from each other. When the transmission periods are different from each other, the transmission period of one of the communication domains (D1, D2) is an integer multiple of the transmission period of the other. For example, when the transmission period of the communication domain (D1) is 250 μs, the transmission period of the communication domain (D2) is 125 μs or 500 μs or the like.

In the example of FIG. 3, a period for the communication domain (D2) is scheduled to arrive after a period for the communication domain (D1). However, it is also possible that the period for the communication domain (D1) is scheduled to arrive after the period for the communication domain (D2). However, in principle, the industrial devices (10D-10F) belonging to both the communication domains (D1, D2) cannot perform communication in both the communication domains (D1, D2) at the same time. Therefore, in principle, the period for the communication domain (D1) and the period for the communication domain (D2) do not overlap.

For example, when a transmission period arrives, after a predetermined synchronization process is performed between the industrial devices 10, the industrial device (10A) generates data (d10) containing commands (5 commands in total) that are respectively for the industrial devices (10B-10F). Since the communication domain (D1) is a normal domain, security processing such as multiplexing of the commands is not performed. That the communication domain (D1) is a normal domain is specified by domain information to be described later. Therefore, the industrial device (10A) transmits the data (d10) to the industrial device (10B) directly connected via a communication cable without performing security processing.

Upon receiving the data (d10), the industrial device (10B) records the data (d10) in its own memory (12B). The industrial device (10B) forwards the data (d10) to the industrial device (10C) directly connected via a communication cable. After that, the data (d10) is forwarded one after another until to the industrial device (10F), which is the lowest in connection order. Upon receiving the data (d10), each of the industrial devices (10B-10F) executes the command for the each of the industrial devices (10B-10F) contained in the data (d10).

For example, when a transmission period arrives, the industrial device (10F) generates data (d11) containing a response to the industrial device (10A). Since the communication domain (D1) is a normal domain, security processing such as multiplexing of the response is not performed. Therefore, the industrial device (10F) transmits the data (d11) to the industrial device (10E) directly connected via a communication cable without performing security processing.

Upon receiving the data (d11), without performing any processing, the industrial device (10E) forwards the data (d11) to the industrial device (10D) directly connected via a communication cable. After that, the data (d11) is forwarded to one industrial device after another industrial device. Similar data generation and data forwarding are performed for the industrial devices (10B-10E). As illustrated in FIG. 3, data (d12-d15) containing responses respectively generated by the industrial devices (10B-10E) are transmitted to the industrial device (10A). When the industrial device (10A) receives the data (d11-d15), the period for the communication domain (D1) ends. After that, the period for the communication domain (D2) begins.

When the period for the communication domain (D2) begins, the industrial device (10D) generates data (d20) containing commands (two commands in total) that are respectively for the industrial devices (10E, 10F). Since the communication domain (D2) is a secure domain, security processing such as multiplexing of the commands is performed. That the communication domain (D2) is a secure domain is specified by domain information to be described later. Therefore, the industrial device (10D) transmits the data (d20), which has been subjected to security processing, to the industrial device (10E) directly connected via a communication cable.

Upon receiving the data (d20), the industrial device (10E) records the data (d20) in its own memory (12E). The industrial device (10E) forwards the data (d20) to the industrial device (10F) directly connected via a communication cable. Upon receiving the data (d20), each of the industrial devices (10E, 10F) executes the command for the each of the industrial devices (10E, 10F) contained in the data (d20).

For example, when a transmission period arrives, the industrial device (10F) generates data (d21) containing a response to the industrial device (10D). Since the communication domain (D2) is a secure domain, security processing such as multiplexing of the response is performed. The industrial device (10F) transmits the data (d21), which has been subjected to security processing, to the industrial device (10E) directly connected via a communication cable.

Upon receiving the data (d21), without performing any processing, the industrial device (10E) forwards the data (d21) to the industrial device (10D) directly connected via a communication cable. Similarly, the industrial device (10E) transmits data (d22) containing a response to the industrial device (10D) to the industrial device (10D). When the industrial device (10D) receives the data (d21, d22), the period for the communication domain (D2) ends. After that, when the next transmission period arrives, communication in each of the communication domains (D1, D2) is performed based on the same communication procedure as in FIG. 3.

As described above, in the control system 1 of the present embodiment, by allowing a secure domain and a normal domain to coexist, it is easy to respond to an abnormality occurring in a network that supports multi-domain. Details of the control system 1 are described below.

Functions Realized by Control System

Figure 4:
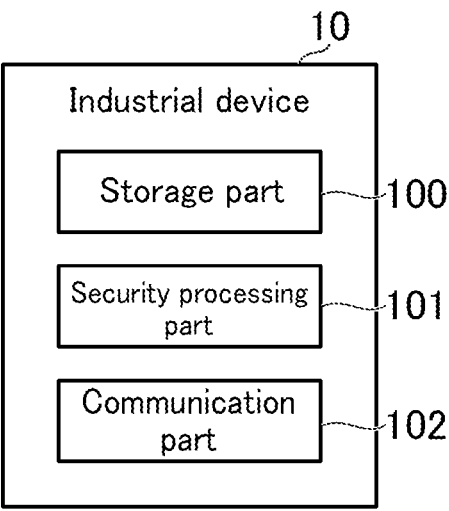
FIG. 4 is a functional block diagram illustrating an example of functions realized by a control system according to an embodiment of the present invention.

FIG. 4 is a functional block diagram illustrating an example of functions realized by the control system 1. In the present embodiment, the industrial devices (10A-10F) have similar functions to each other. Therefore, FIG. 4 illustrates functions of one industrial device 10. A storage part 100 is mainly realized by the memory 12. A security processing part 101 is mainly realized by the CPU 11. A communication part 102 is mainly realized by the CPU 11 and the communication IF 13.

In the present embodiment, the industrial devices (10A-10C) belong only to the communication domain (D1), which is a normal domain. Therefore, although the industrial devices (10A-10C) do each have the function for secure communication (including the function of the security processing part 101 and some of the functions of the storage part 100 and the communication part 102), this function is not used in actual communication.

Storage Part

The storage part 100 stores data necessary for communication in the control system 1. For example, the storage part 100 stores domain information indicating whether or not one or more communication domains (D) to which the storage part 100 belongs is a secure domain in which secure communication is performed. For example, when a user sets communication domains (D) from an engineering tool, domain information generated by the engineering tool is recorded in the storage part 100. Tools for generating and recording domain information may be any tools and are not limited to engineering tools. For example, domain information may be generated and recorded based on operations from an input device that can be connected to an industrial device 10.

FIG. 5 illustrates an example of domain information. For example, domain information includes names of communication domain (D), types of the communication domains (D), names of first industrial devices in the communication domains (D), names of second industrial devices in the communication domains (D), and schedules in the communication domains (D). Domain information can include any information about a communication domain (D) and is not limited to the example in FIG. 5. For example, domain information may include only a type of a communication domain (D).

Domain information stored in the storage part 100 of a certain industrial device 10 indicates information about a communication domain (D) to which this industrial device 10 belongs. In the example of FIG. 5, since information about both the communication domains (D1, D2) is indicated in the domain information, it is domain information stored by the industrial devices (10D-10F), which belong to both the communication domains (D1, D2). Domain information of the industrial devices (10A-10C), which belong only to the communication domain (D1), indicates only information about the communication domain (D1). However, information about the communication domain (D2) may be indicated in the domain information of the industrial devices (10A-10C).

A name of a communication domain (D) is an example of domain identification information that can identify the communication domain (D). It is also possible that a communication domain (D) is identified by other information such as an ID or a number of the communication domain (D) rather than the name of the communication domain (D). A type of a communication domain (D) is information indicating whether the communication domain (D) is a secure domain or a normal domain. A name of an industrial device 10 is an example of device identification information that can identify the industrial device 10. The device identification information may be other information such as an ID or an IP address rather than a name of an industrial device 10.

A schedule is information indicating an order of communication between the industrial devices 10. In the present embodiment, since periodic communication is performed, a schedule defines a communication procedure in a certain transmission period. For example, a schedule defines an elapsed time from a start time of a transmission period and a party to communicate with during that time. The elapsed time may be managed using time information such as a timer value. The storage part 100 also stores the time information. The time information is appropriately counted up. The time information may be synchronized by a synchronization process performed at beginning of a transmission period.

In the present embodiment, a case is described where domain information is stored in both a first industrial device and a second industrial device. However, it is also possible that domain information is stored only in the first industrial device, which transmits a command. That is, it is not necessary to store domain information may in a second industrial device. In this case, a second industrial device may identify whether it belongs to a secure domain or a normal domain based on a command from a first industrial device.

The storage part 100 stores various data other than the domain information. For example, the storage part 100 stores a program (application) for generating data before security processing is performed. In secure communication, data generated by this program is subjected to security processing. Security processing itself is also executed by some information processing. However, since details of the processing are defined by a communication protocol, in the present embodiment, it is assumed that users of the control system 1 do not create programs for security processing by themselves. It is also possible that a program for security processing can be created or edited by a user.

For example, the storage part 100 of a first industrial device stores a control program and a parameter. The control program includes processing for generating a command. The control program can be written in any language, such as a ladder language or a robot language. The parameter is information about an operation of an industrial device 10 to be controlled, such as a rotation direction of a motor, a rotation speed of a motor, or a target position of a robot.

For example, the storage part 100 of a second industrial device stores an operation program and a parameter. The operation program includes processing for performing an operation according to a command, and processing for generating a response. The operation program can be written in any language, such as a ladder language or a robot language. A program referred to as a job is also a type of operation program. The parameter is information used to control a mechanism such as a motor or a robot. For example, the parameter is information such as a rotation direction of a motor, a rotation speed of a motor, or a target position of a robot.

Security Processing Part

The security processing part 101 performs security processing related to secure communication when the domain information indicates a secure domain. The security processing part 101 does not perform security processing when the domain information does not indicate a secure domain (when the domain information indicates a normal domain). In the present embodiment, the security processing part 101 determines whether or not a communication domain (D) to which the industrial device 10 belongs is a secure domain based on the type of the communication domain (D) indicated by the domain information.

The industrial device 10 generates source data of data to be transmitted regardless of the type of the communication domain (D) to which the industrial device 10 belongs. When the industrial device 10 belongs to a secure domain, the security processing part 101 performs security processing with respect to the generated data and generates data to be actually transmitted. When the industrial device belongs to a normal domain, the generated data is not subjected to security processing and is transmitted as is by the communication part 102 to be described later.

For example, a first industrial device belonging to a secure domain generates a command for a second industrial device belonging to the same secure domain based on the control program. The security processing part 101 of the first industrial device performs security processing with respect to the generated command and generates data to be actually transmitted. In the example of FIGS. 2 and 3, the industrial device (10D) corresponds to a first industrial device belonging to a secure domain. Therefore, the industrial device (10D) respectively generates commands for the industrial devices (10E, 10F) based on the control program. The security processing part 101 of the industrial device (10D) performs security processing on the generated two commands and generates the data (d20) to be actually transmitted.

For example, a second industrial device belonging to a secure domain generates a response to the first industrial device belonging to the same secure domain based on the operation program. The response can include various information such as an execution result of a command, or a physical quantity detected by a sensor. The security processing part 101 of the second industrial device performs security processing with respect to the generated response and generates data to be actually transmitted. In the example of FIGS. 2 and 3, the industrial devices (10E, 10F) correspond to second industrial devices belonging to a secure domain. Therefore, each of the industrial devices (10E, 10F) generates a response for the industrial device (10D) based on the operation program. The security processing part 101 of each of the industrial devices (10E, 10F) performs security processing on the generated response and generates the data (d21) or the data (d22) to be actually transmitted.

FIG. 6 illustrates an example of data that has been subjected to security processing. FIG. 6 illustrates an example of the data (d20) generated by the security processing part 101 of the industrial device (10D), which corresponds to the first industrial device. The respective commands to the industrial devices (10E, 10F) are included as payloads of the data (d20). The data (d20) is a data collection transmitted in secure communication. The data (d20) may also be referred to as a frame, a packet, or a segment.

For example, a data region from beginning to a predetermined number of bits contains a preamble, a delimiter, and an overall header. The preamble is a predetermined bit string. The delimiter is a bit string that indicates a data delimiter. The overall header contains an IP address of the industrial device (10D) as a transmission source. IP addresses of the destination industrial devices (10E, 10F) as transmission destinations may be included in the overall header, or may be included in individual headers to be described later.

A data region is allocated for each second industrial device in a portion after the overall header. In the present embodiment, a case where a data region for each second industrial device corresponds to a payload is described. However, since a beginning portion of the data can be identified by the delimiter, the portion after the delimiter may be used as a payload. The portion corresponding to the payload may be a portion of the data (d20) where a substantial content is stored.

A data region for each second industrial device contains an individual header and a PDU (Protocol Data Unit) for secure communication. The individual header includes device identification information such as the IP address of the second industrial device. With the individual header, it is possible to identify which industrial device 10 the PDU for secure communication is for. The PDU for secure communication includes a command to the second industrial device. The PDU for secure communication may also include any information other than the command. For example, when a certain parameter needs to be transmitted to the second industrial device, the parameter may be included in the PDU for secure communication.

For example, the command included in the PDU for secure communication is multiplexed by the security processing. For example, when an abnormality occurs in the network, a predetermined command is included in the PDU for secure communication by the security processing. The predetermined command is a command for putting the secure domain in a fail-safe state, for example, a command for preventing the industrial device 10 from performing any operation, or a command for gradually stopping an operation of a mechanism such as a motor or a robot. A subject of the security processing may be any data included in the PDU for secure communication and is not limited to a command. For example, when a certain parameter is included in the PDU for secure communication, the security processing may be performed with respect to the parameter.

A data region at the end of the data in FIG. 6 includes an overall error detection code. For example, due to the security processing, the error detection code included in the data region at the end may be larger than that for normal communication. A format of data transmitted between the industrial devices 10 is not limited to that in the example in FIG. 6. In FIG. 6, the case is described where the respective commands for the multiple industrial devices 10 are grouped as one set of data. However, the respective commands for the industrial devices 10 may be separated into separate sets of data. Data transmitted between the industrial devices 10 conform to a predetermined format.

The security processing part 101 generates one set of data (d20) that does not include a portion for normal communication as a payload but includes a portion for secure communication as a payload. In the example of FIG. 6, a portion other than the preamble, the delimiter, the overall header, and the overall error detection code (a portion sandwiched between the overall header and the overall error detection code in FIG. 6) corresponds to a payload. In the present embodiment, the security processing part 101 of the industrial device (10D) as a first industrial device generates the one set of data (d20) including, as payloads, a data region of the industrial device (10E) as a second industrial device and a data region of the industrial device (10F) as a second industrial device.

The security processing part 101 may generate one set of data (d10) that includes multiple portions for secure communication as payloads and in which individual error detection codes are respectively set for the portions. In the example of FIG. 6, an individual error detection code is set for each secure PDU. In the present embodiment, the security processing part 101 of the industrial device (10D) as a first industrial device generates one set of data (d20) by setting an individual error detection code for the secure PDU for the industrial device (10E) as a second industrial device, and setting an individual error detection code for the secure PDU for the industrial device (10F) as a second industrial device.

FIG. 6 illustrates an example of the data (d20) from the industrial device (10D) as a first industrial device to the industrial devices (10E, 10F) as second industrial devices. However, the data (d21) or the data (d22) from each of the industrial devices (10E, 10F) as second industrial devices to the industrial device (10D)) as a first industrial device may be in the same format. For example, the data (d21) includes a preamble, a delimiter, an overall header, and an overall error detection code similar to those in FIG. 6. A data region corresponding to a response for which security processing has been performed is included between the overall header and the overall error detection code. An individual header of this data region includes device identification information of the second industrial device that has generated the response. A PDU for secure communication in this data region includes a response that has been subjected to security processing such as multiplexing.

Further, the format of the data (d10, d11) in normal communication is different only in the portion of the data (d20, d21) in secure communication that has been subjected to security processing. For example, the data (d10, d11) in normal communication may have the same preamble, delimiter, overall header, and overall error detection code as those in secure communication. The overall error detection code may have a smaller code size than that in secure communication. A data region between the overall header and the overall error detection code includes an individual header and a PDU for normal communication. A PDU for normal communication includes a command or a response that has not been subjected to security processing such as multiplexing.

Communication Part

The communication part 102 performs communication with other industrial devices 10 as communication partners. For example, the communication part 102 performs secure communication based on security processing. The communication part 102 performs secure communication by transmitting data that has been subjected to security processing to another industrial device 10 belonging to the same secure domain. In the present embodiment, periodic communication is performed in each of the multiple communication domains (D). Therefore, the communication part 102 periodically performs secure communication. Therefore, the communication part 102 periodically performs secure communication based on a schedule stored in the storage part 100. The communication part 102 performs secure communication by transmitting one set of data illustrated in FIG. 6. The communication part 102 transmits data that has not been subjected to security processing to another industrial device 10 belonging to the same normal domain.

As described above, a first industrial device and a second industrial device controlled by the first industrial device belong to each of the multiple communication domains (D), The first industrial device and the second industrial device belonging to a secure domain each include the storage part 100, the security processing part 101, and the communication part 102. In the present embodiment, the case is described where the first industrial device and the second industrial device belonging to a normal domain each also includes the storage part 100, the security processing part 101, and the communication part 102. However, when the first industrial device and the second industrial device belonging to a normal domain do not belong to a secure domain, the first industrial device and the second industrial device do not have to have the function for secure communication (including the function of the security processing part 101 and some of the functions of the storage part 100 and the communication part 102).

In the present embodiment, the communication domain (D1) is an example of a first communication domain. Therefore, a part described as the communication domain (D1) can be read as the first communication domain. The communication domain (D2) is an example of a second communication domain. Therefore, a part described as the communication domain (D2) can be read as the second communication domain. All of the multiple industrial devices 10 belong to the first communication domain. Two or more of the multiple industrial devices 10 belong to the second communication domain.

It is also possible that, in a secure domain, only a command is subjected to security processing and a response is not subjected to security processing. In this case, only the first industrial device transmitting a command has the function for secure communication, and the second industrial device transmitting a response does not have to have the function for secure communication. conversely, it is also possible that, in a secure domain, only a response is subjected to security processing and a command is not subjected to security processing. In this case, only the second industrial device transmitting a response has the function for secure communication, and the first industrial device transmitting a command does not have to have the function for secure communication.

Processing Executed by Control System

Figure 7:
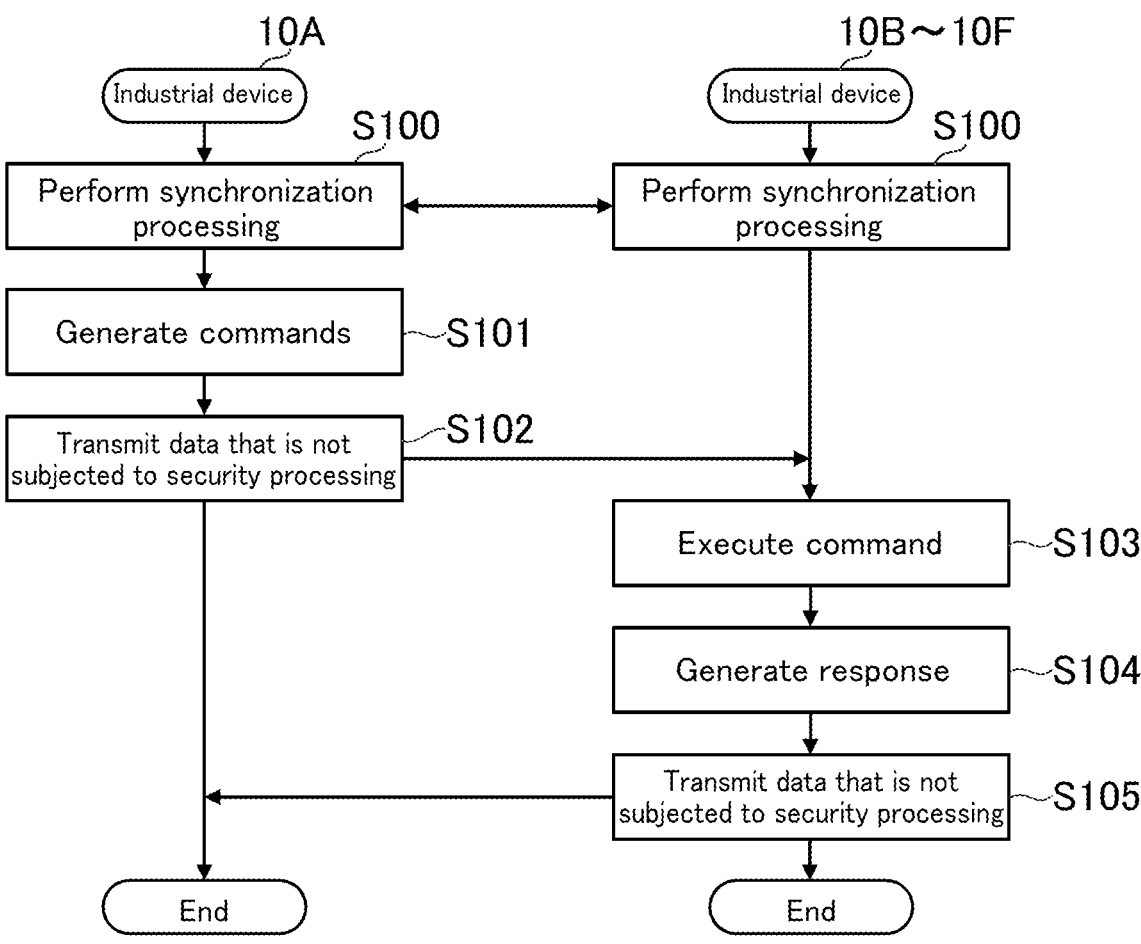
FIG. 7 is a flow diagram illustrating an example of processing executed by a control system according to an embodiment of the present invention.
Figure 8:
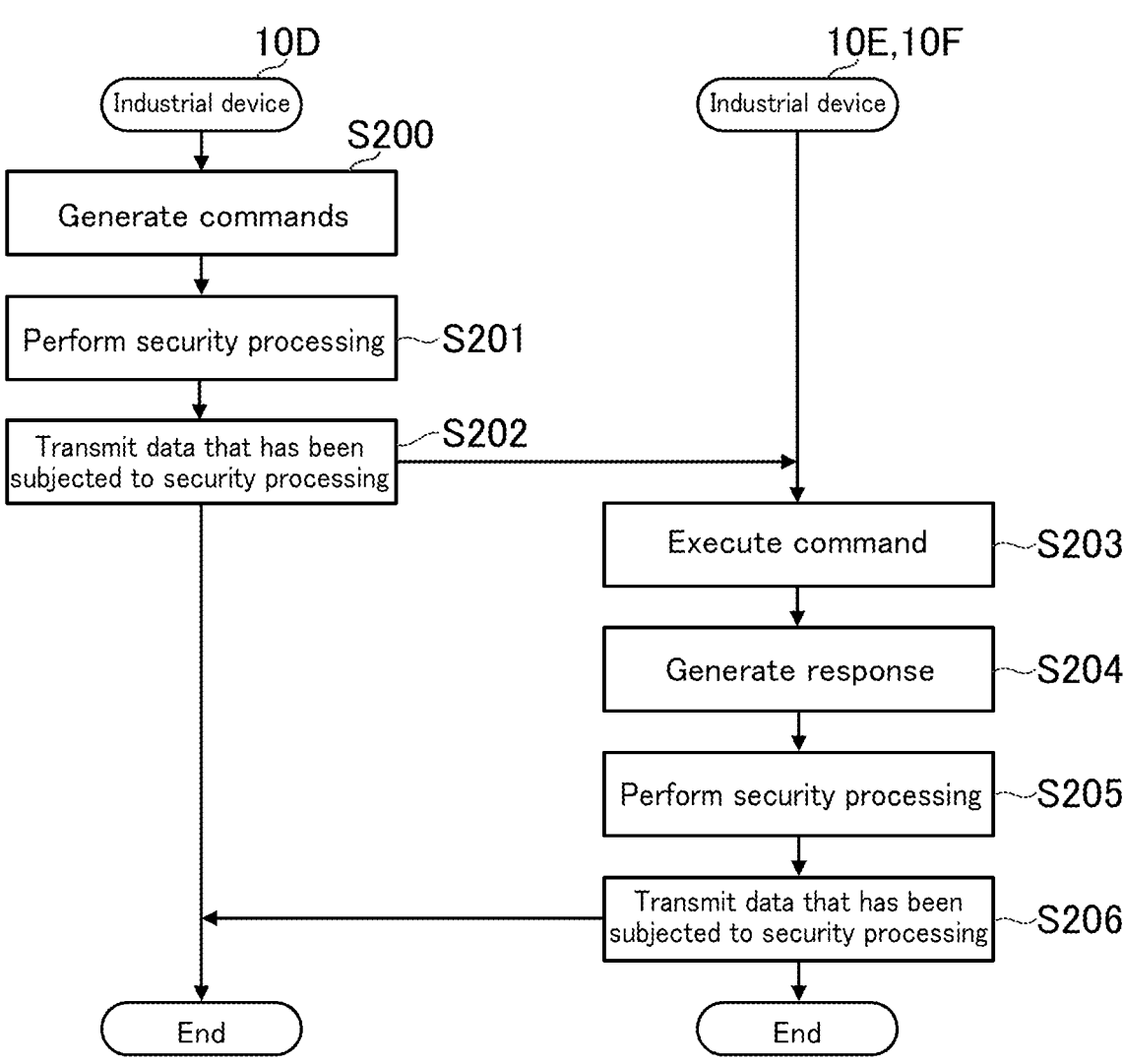
FIG. 8 is a flow diagram illustrating an example of processing executed by a control system according to an embodiment of the present invention.

FIGS. 7 and 8 are flow diagrams illustrating an example of processing executed by the control system 1. The processing in FIGS. 7 and 8 is executed based on a schedule stored in an industrial device 10 when a transmission period arrives. In the present embodiment, an example of processing in a case where communication is performed according to the schedule illustrated in FIG. 3 in the communication domains (D) illustrated in FIG. 2 is described. FIG. 7 illustrates processing of normal communication performed in the communication domain (D1). FIG. 8 illustrates processing of secure communication performed in the communication domain (D2).

As illustrated in FIG. 7, upon detecting the arrival of a start time of a transmission period based on the time information stored in the memory (12A), the industrial device (10A) performs synchronization processing with each of the industrial devices (10B-10F) (S100). The industrial device (10A) respectively generates commands for the industrial devices (10B-10F) based on the control program (S101). The industrial device (10A) identifies that the communication domain (D1) is a normal domain based on the domain information, and thus, does not perform security processing. The industrial device (10A) transmits the data (d10), which is not subjected to security processing, to the industrial device (10B) (S102). After that, the data (d10) is forwarded one after another until being received by the industrial device (10F).

Each of the industrial devices (10B-10F) executes the command for the each of the industrial devices (10B-10F) included in the data transmitted by the industrial device (10A) (S103). Each of the industrial devices (10B-10F) generates a response to the industrial device (10A) based on the operation program (S104). In each of the industrial devices (10B-10F), since the communication domain (D1) is identified as a normal domain based on the domain information, security processing is not performed. The industrial devices (10B-10F) respectively transmit the data (d11-d15), which are not subjected to security processing, to the industrial device (10A) (S105). The industrial device (10A) receives the data (d11-d15), which are not subjected to security processing. As a result, the normal communication in the communication domain (D1) is completed.

As illustrated in FIG. 8, upon detecting the arrival of a start time of a period for the communication domain (D2) based on the time information stored in the memory (12D), the industrial device (10D) respectively generates commands for the industrial devices (10E, 10F) based on the control program (S200). The industrial device (10) identifies that the communication domain (D2) is a secure domain based on the domain information, and performs security processing with respect to the commands generated in S200. The industrial device (10D) transmits the data (d20) to the industrial device (10E) based on the security processing performed in S201 (S202). The industrial device (10E) forwards the data (d20) received from the industrial device (10D) to the industrial device (10F).

Each of the industrial devices (10E, 10F) executes the command for the each of the industrial devices (10E, 10F) included in the data transmitted by the industrial device (10D) (S203). Each of the industrial devices (10E, 10F) generates a response with respect to the command for the each of the industrial devices (10E, 10F) (S204). Each of the industrial devices (10E, 10F) identifies that the communication domain (D2) is a secure domain based on the domain information and performs security processing with respect to the response generated in S204 (S205). The industrial devices (10E, 10F) respectively transmit the data (d21, d22), which have been subjected to security processing, to the industrial device (10D) (S206). The industrial device (10D) receives the data (d21, d22), which have been subjected to security processing, and the communication in the transmission period ends. As a result, the secure communication in the communication domain (D2) is completed. When the next transmission period arrives, the processing is executed from S100 in FIG. 7.

According to the control system 1 of the present embodiment, by realizing secure communication in the multi-domain control system 1, it is easy to respond to an abnormality that occurs in a network that supports multi-domain. For example, an industrial device 10 belonging to a secure domain performs secure communication, and thereby, a malfunction of the industrial device 10 can be prevented. For example, even when an abnormality has occurred due to noise or the like in the network, instead of stopping the operation of all of the industrial devices 10, it is possible to stop the operation of only the industrial devices 10 belonging to the communication domain (D) in which the abnormality has occurred and to continue the operation of the industrial devices 10 belonging to other communication domains (D). Production efficiency in the control system 1 is increased.

Further, in the control system 1, periodic communication is performed in each of the multiple communication domains (D), and secure communication is periodically performed in the secure domain. As a result, it is easy to respond to an abnormality occurring in a network in which periodic communication is performed.

Further, each of the multiple communication domains (D) includes a first industrial device and a second industrial device controlled by the first industrial device. As a result, it is easy to respond to an abnormality occurring in the network of the control system 1 in which there are multiple first industrial devices on a controlling side. For example, it is possible to prevent the second industrial device from malfunctioning due to noise in the command transmitted by the first industrial device. For example, it is possible to prevent an operation result of the second industrial device from being erroneously transmitted to the first industrial device due to noise in the response transmitted by the second industrial device.

Further, among the multiple communication domains (D) in the control system 1, there is not only a secure domain but also a normal domain. As a result, a secure domain and a normal domain can coexist. For example, usability is improved when an industrial device 10 that a user wants to stop its operation when an abnormality occurs in the network and an industrial device 10 that the user does not want to stop its operation even when there is some abnormality coexist. For example, even when an abnormality occurs in a secure domain and operation of an industrial device 10 belonging to the secure domain has stopped, when operation of an industrial device 10 belonging to a normal domain is not stopped, production efficiency in the control system 1 is increased.

Further, the control system 1 generates one set of data that does not include a portion for normal communication as a payload but includes a portion for secure communication as a payload. Since a portion that has been subjected to security processing is included as a payload, accuracy of secure communication is improved. For example, since a portion for normal communication is not included, a data size of each individual set of data can be reduced. As a result, a communication load of the network can be reduced.

Also, in the control system 1, all of the multiple industrial devices 10 belong to the communication domain (D1), and two or more industrial devices 10 among the multiple industrial devices 10 belong to the communication domain (D2). As a result, a network can be constructed in which the communication domain (D1) includes the other communication domain (D2). For example, the industrial device (10A) belonging to the overall communication domain (D1) can collectively manage the entire network, while partial local communication can be performed in the communication domain (D2). Therefore, it becomes possible to set a local control group while improving management efficiency of the network.

Further, in the control system 1, by setting an individual error detection code for each portion for secure communication in a certain set of data, accuracy of secure communication is improved.

Modified Embodiments

The present disclosure is not limited to the embodiment described above. Appropriate modifications are possible within a scope without departing from the spirit of the present disclosure.

Figure 9:
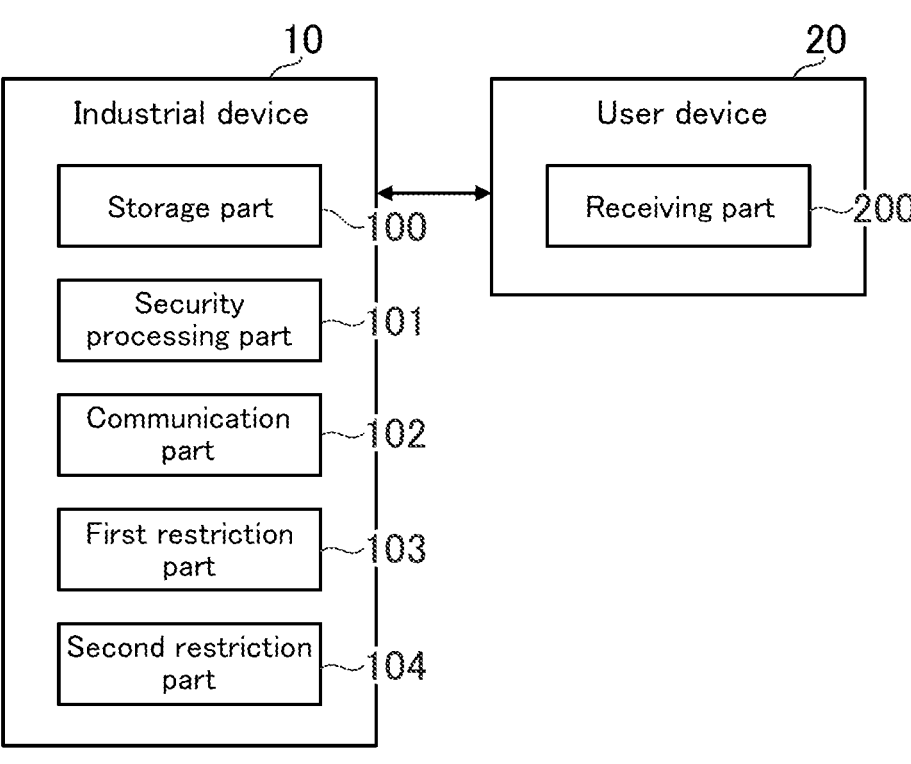
FIG. 9 illustrates an example of functional blocks according to a modified embodiment of the present invention.

FIG. 9 illustrates an example of functional blocks of modified embodiments. A first restriction part 103 and a second restriction part 104 are mainly realized by the CPU 11. A receiving part 200 is realized by a user device 20 operated by a user. For example, the user device 20 is a personal computer, a tablet terminal, or a smart phone. For example, the user device 20 has an engineering tool installed thereon. The user device 20 can be connected to an industrial device 10 via a communication cable. The user can perform various settings of the industrial device 10 from the engineering tool of the user device 20.

First Modified Embodiment

For example, in the embodiment, it is also possible that all of the multiple communication domains (D) in the control system 1 are secure domains. That is, it is also possible that the control system 1 has only secure domains without any normal domain. In a first modified embodiment, a case is described as an example where respective combinations of industrial devices 10 belonging to multiple secure domains are different from each other. However, it is also possible that the respective combinations of the industrial devices 10 belonging to the multiple secure domains are the same as each other.

Figure 10:
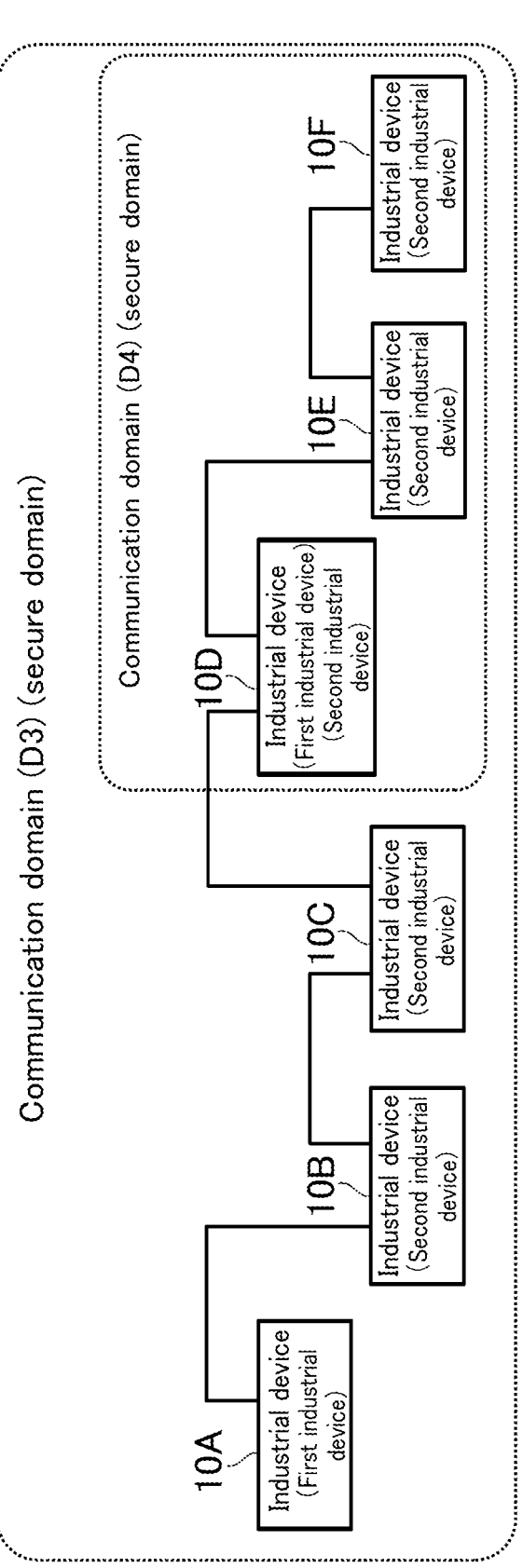
FIG. 10 illustrates an example of communication domains according to a first modified embodiment of the present invention.

FIG. 10 illustrates an example of the communication domains (D) in the first modified embodiment. In the example of FIG. 10, both the communication domains (D3, D4) are secure domains. All of the industrial devices (10A-10F) belong to the communication domain (D3). In the first modified embodiment, the industrial device (10A) controls the industrial devices (10B-10F). The industrial devices (10D-10F) belong to the communication domain (D4). In the first modified embodiment, the industrial device (10D) controls the industrial devices (10E, 10F).

In the first modified embodiment, similar to FIG. 3, a period for the communication domain (D3) and a period for the communication domain (D4) exist in one transmission period. A communication procedure in the communication domain (D3) is similar to that in the communication domain (D1), but differs from the embodiment in that security processing is performed. For example, when commands (5 commands in total) for the industrial devices (10B-10F) are respectively generated, the security processing part 101 of the industrial device (10A) performs security processing with respect to the generated commands. Data that has been subjected to security processing may be similar to that in FIG. 6.

When a response for the industrial device (10A) is generated, the security processing part 101 of each of the industrial devices (10B-10F) performs security processing with respect to the generated response. The meaning of the "security processing" is as described in the embodiment. In the first modified embodiment, the security processing in the communication domain (D3) and the security processing in the communication domain (D4) are the same as each other. For example, a code size of an error detection code added by the security processing in the communication domain (D3) and a code size of an error detection code added by the security processing in the communication domain (D4) are the same as each other. For example, multiplexing of the security processing in the communication domain (D3) and multiplexing of the security processing in the communication domain (D4) are the same as each other. The communication procedure of the communication domain (D4) is the same as that of the communication domain (D2).

The security processing in the communication domain (D3) and the security processing in the communication domain (D4) may be different from each other. For example, the code size of the error detection code added by the security processing in the communication domain (D4) may be larger than the code size of the error detection code added by the security processing in the communication domain (D3). For example, the multiplexing of the security processing in the communication domain (D4) may be more than the multiplexing of the security processing in the communication domain (D3).

According to the first modified embodiment, by having a network with only multiple secure domains, it becomes easier to respond an abnormality occurring in the network. Since there are only secure domains, a malfunction of the industrial devices 10 can be more reliably prevented.

Second Modified Embodiment

For example, when a secure domain and a normal domain coexist as in the embodiment, it is also possible that the domain information is also recorded in the storage part 100 of an industrial device 10 belonging to the normal domain. In this case, the communication part 102 performs normal communication by transmitting data that has not been subjected to security processing when the domain information indicates a normal domain. The communication part 102 performs secure communication by transmitting data that has been subjected to security processing when the domain information indicates a secure domain.

An industrial device 10 belonging to both a secure domain and a normal domain identifies the types of the communication domains (D) to which the industrial device 10 belongs based on the domain information. An industrial device 10 belonging only to a normal domain also identifies that the industrial device 10 belongs only to a normal domain based on the domain information. An industrial device 10 belonging only to a secure domain also identifies that the industrial device 10 belongs only to a secure domain based on the domain information.

According to the second modified embodiment, an industrial device 10 can respond to both normal communication and secure communication according to the domain information. Therefore, a network can be flexibly and easily formed. For example, even when a position of an industrial device 10 in the control system 1 is changed and an industrial device 10 belonging to a normal domain is changed to belonging to a secure domain, since the industrial device 10 can respond to any one of the communication domains (D), user's work of changing settings can be simplified. For example, when an industrial device 10 that responds to only normal communication or secure communication is adopted, it is not possible to flexibly respond to a change in network settings. However, by adopting an industrial device 10 that can respond to both normal communication and secure communication, it is possible to flexibly respond to a change in network settings.

Third Modified Embodiment

For example, the security processing part 101 may generate one set of data including both a first portion for normal communication and a second portion for secure communication as payloads. The first portion is a portion for which security processing is not performed. The second portion is a portion for which security processing is performed. The security processing part 101 of the third modified embodiment generates one set of data that includes a portion for which security processing is not performed and a portion for which security processing is performed as payloads.

FIG. 11 illustrates an example of data that has been subjected to security processing in the third modified embodiment. Similar to FIG. 6, FIG. 11 illustrates data generated by the security processing part 101 of a first industrial device. That is, a command from a first industrial device to a second industrial device is included as a payload of the data in FIG. 11. A preamble, a delimiter, and an overall header at the beginning and an overall error detection code at the end are the same as those in FIG. 6. That PDUs are generated for each second industrial device is similar to that in FIG. 6. However, for a certain second industrial device, there are a normal PDU that has not been subjected to security processing and a secure PDU that has been subjected to security processing.

For example, when a command and a parameter are included in a PDU and transmitted to a second industrial device, security processing is performed when respect to the command, but security processing is required for the parameter. In this case, the security processing part 101 performs security processing with respect to the command to the second industrial device and generates a secure PDU. The security processing part 101 uses the parameter to be transmitted to the second industrial device as it is as a normal PDU without performing security processing. The communication part 102 performs secure communication by transmitting one set of data in a format as illustrated in FIG. 11. In a response from a second industrial device to the first industrial device, a normal PDU and a secure PDU can coexist similar to that in FIG. 11.

According to the third modified embodiment, by transmitting one set of data in which a portion for normal communication and a portion for secure communication coexist, flexible data communication can be performed. For example, when data to be transmitted to a certain industrial device 10 includes data that requires security processing and data that does not require security processing, both can be included in one set of data. Since there is no need to perform security processing for data that does not require security processing, an industrial device 10 does not need to perform unnecessary processing, and a processing load on the industrial device 10 can be reduced. Since unnecessary multiplexing is not performed, a data size can be reduced. As a result, a communication load of the network can be reduced.

Fourth Modified Embodiment

For example, the multiple industrial devices 10 may include an industrial device 10 belonging to both the first communication domain and the second communication domain, an industrial device 10 belonging to the first communication domain but not to the second communication domain, and an industrial device 10 belonging to the second communication domain but not to the first communication domain. In a fourth modified embodiment, a case is described where both the first communication domain and the second communication domain are secure domains. However, it is also possible that one of the first communication domain and the second communication domain is a normal domain.

Figure 12:
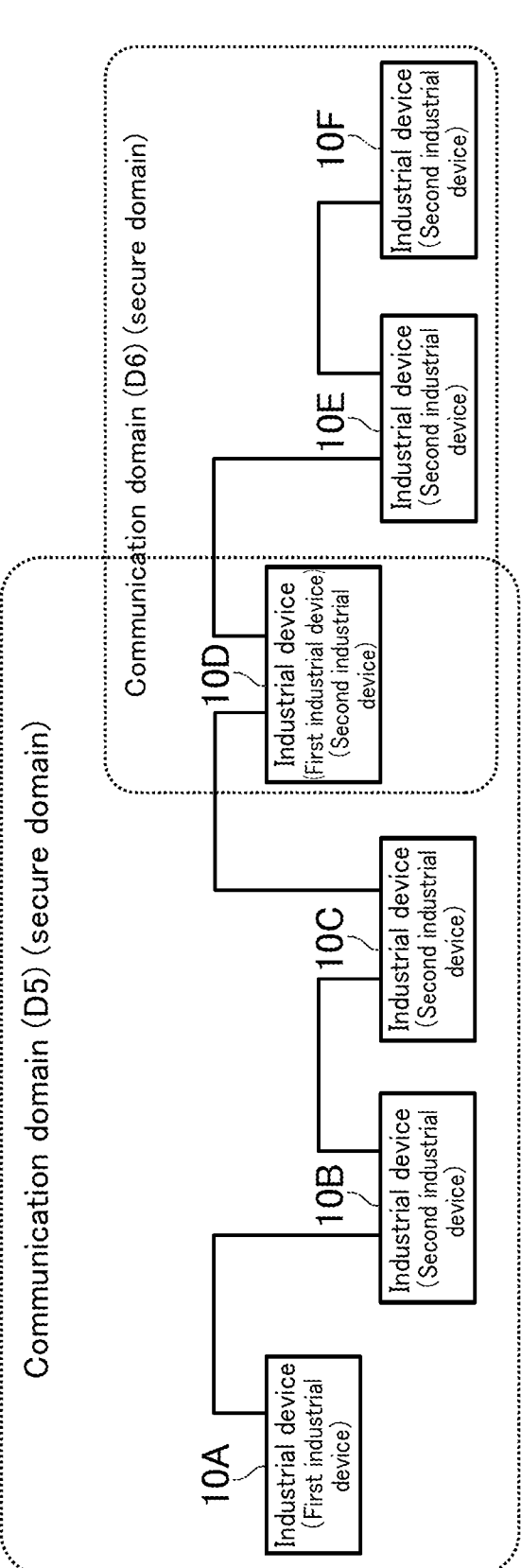
FIG. 12 illustrates an example of communication domains in a fourth modified embodiment of the present invention.

FIG. 12 illustrates an example of the communication domains (D) in the fourth modified embodiment. In the example of FIG. 12, both the communication domains (D5, D6) are secure domains. The industrial devices (10A-10D) belong to the communication domain (D5). For example, the industrial device (10A) controls the industrial devices (10B-10D). The industrial devices (10D-10F) belong to the communication domain (D6). For example, the industrial device (10D) controls the industrial devices (10E, 10F).

In the fourth modified embodiment, similar to FIG. 3, a period for the communication domain (D5) and a period for the communication domain (D6) exist in one transmission period. A communication procedure in the communication domains (D5, D6) may be similar to that in the embodiment and the first-third modified embodiments. For example, when a certain transmission period arrives, the industrial device (10A) transmits data that has been subjected to security processing to each of the industrial devices (10B-10D) belonging to the communication domain (D5). Each of the industrial devices (10B-10D) executes a command for the each of the industrial devices (10B-10D) and then transmits data that has been subjected to security processing to the industrial device (10A).

When the period for the communication domain (D5) ends, the industrial device (10D) transmits data that has been subjected to security processing to each of the industrial devices (10E, 10F) belonging to the communication domain (D6). Each of the industrial devices (10E, 10F) executes a command for the each of the industrial devices (10E, 10F) and then transmits data that has been subjected to security processing to the industrial device (10D). After that, every time a transmission period arrives, communication is performed with the same procedure. In order to perform an overall synchronization process of the control system 1 at beginning of a transmission period, a communication domain (D) to which all of the industrial devices (10A-10F) belong may be separately provided, or a synchronization process may be performed only in each of the communication domains (D5, D6).

According to the fourth modified embodiment, a network can be constructed in which a certain communication domain (D) and another communication domain (D) only partially overlap each other. For example, it is possible that partial local communication is performed in a first communication domain, while local communication of a range different from that of the first communication domain is performed in a second communication domain. It is also possible that an industrial device 10 belonging to both the first communication domain and the second communication domain manages the two communication domains (D).

Fifth Modified Embodiment

For example, in a case where one or more industrial devices 10 belong to multiple secure domains, when an abnormality occurs in a certain secure domain, secure communication in this secure domain may be restricted. Further, secure communication may be restricted not only in a secure domain in which an abnormality has occurred, but also in another secure domain in which no abnormality has occurred. In a fifth modified embodiment, one or more industrial devices 10 belonging to multiple secure domains each have a first restriction part 103 and a second restriction part 104.

When an abnormality has occurred in any one of the multiple secure domains, the first restriction part 103 restricts secure communication in the secure domain in which the abnormality has occurred. Restricting secure communication means to prevent processing that is to be performed in secure communication from being executed. Restricting secure communication means to perform processing different from that when no abnormality has occurred. In the fifth modified embodiment, a case is described as an example where changing a content of data to be transmitted in secure communication corresponds to restricting secure communication. However, a method for restricting secure communication is not limited to the restriction method of the fifth modified embodiment as long as the method allows secure communication to be restricted in some way.

For example, not performing data transmission in secure communication may correspond to restricting secure communication. Even when data transmission cannot be stopped according to a communication protocol, secure communication may be restricted by stopping data transmission in secure communication by processing on an application side. Further, for example, when data in secure communication is received, not executing processing based on the data may correspond to restricting secure communication. That is, that an industrial device 10, which has received data in secure communication, performs the data reception itself but discards the data without executing the command for the industrial device 10 included in the data may correspond to restricting secure communication. In this case, information indicating that the command is not to be executed is included in the data.

An industrial device 10 determines whether or not an abnormality has occurred in a communication domain (D) based on a predetermined determination method. For example, an industrial device 10 determines that an abnormality has occurred in a communication domain (D) when an error has been detected based on an error detection code. For example, an industrial device 10 determines that an abnormality has occurred in a communication domain (D) when data has not been received for a certain period. For example, an industrial device 10 determines that an abnormality has occurred in a communication domain (D) when data has not been received in a certain transmission period. For example, an industrial device 10 determines that an abnormality has occurred in a communication domain (D) when an individual portion of data is missing or there is a value that is impossible in a normal format. Methods for determining occurrence of an abnormality are not limited to the above described examples, and various methods can be used.

When an abnormality has occurred, the second restriction part 104 restricts secure communication in a secure domain in which no abnormality has occurred. A method of restricting secure communication may be the same as that of the first restriction part 103. In the case of the network of the first modified embodiment, when an abnormality has occurred in the communication domain (D3), the first restriction part 103 of an industrial device 10 belonging to the communication domain (D3) restricts secure communication performed in the communication domain (D4) by the industrial device 10. The second restriction part 104 of an industrial device 10 belonging to the communication domain (D4) in which no abnormality has occurred restricts secure communication performed in the communication domain (D4) by the industrial device 10.

According to the fifth modified embodiment, when an abnormality is detected in a certain secure domain, the abnormality can be more reliably responded to by restricting secure communication not only in the certain secure domain but also in other secure domains. As a result, a malfunction of the industrial devices 10 can be more reliably prevented.

Sixth Modified Embodiment

For example, in the fifth modified embodiment, the case is described where secure communication is restricted in a secure domain in which no abnormality has occurred. However, it is not necessary to restrict secure communication in a secure domain in which no abnormality has occurred. In a sixth modified embodiment, each of the industrial devices 10 has the first restriction part 103 described in the fifth modified embodiment, but do not have the second restriction part 104.

The communication part 102 of an industrial device 10 belonging to a secure domain in which no abnormality has occurred continues secure communication in the secure domain in which no abnormality has occurred. In the case of the communication domains (D) in the first modified embodiment, when an abnormality has occurred in the communication domain (D3), the first restriction part 103 of an industrial device 10 belonging to the communication domain (D3) restricts secure communication in the communication domain (D3) performed by the industrial device 10. The communication part 102 of an industrial device 10 belonging to the communication domain (D4) in which no abnormality has occurred continues secure communication without restricting the secure communication performed in the communication domain (D4) by the industrial device 10.

According to the sixth modified embodiment, when an abnormality is detected in a certain secure domain, by restricting secure communication in the certain secure domain and not restricting secure communication in other secure domains, it is possible to respond to the abnormality in the certain secure domain in which the abnormality has occurred and to continue operation of an industrial device 10 in the other secure domains in which no abnormality has occurred. As a result, production efficiency in the control system 1 is increased.

Seventh Modified Embodiment

For example, it is also possible to allow a user to select whether to restrict secure communication in a secure domain in which no abnormality has occurred as in the fifth modified embodiment or not to restrict secure communication in a secure domain in which no abnormality has occurred as in the sixth modified embodiment. A control system 1 of a seventh modified embodiment includes a receiving part 200. The receiving part 200 receives a selection regarding whether or not to restrict secure communication in a secure domain in which no abnormality has occurred among multiple secure domains. For example, the user device 20 displays a screen as a user interface for receiving a selection regarding whether or not to restrict secure communication in a secure domain in which no abnormality has occurred. This screen may be displayed as a screen of an engineering tool. The receiving part 200 receives a user's selection by receiving an input with respect to the screen.

When an abnormality has occurred and it is selected to restrict secure communication in a secure domain in which no abnormality has occurred, the second restriction part 104 of the seventh modified embodiment restricts the secure communication in the secure domain in which no abnormality has occurred. In this case, similar to the fifth modified embodiment, secure communication in a secure domain in which no abnormality has occurred is restricted. When it is not selected to restrict secure communication in a secure domain in which no abnormality has occurred, the second restriction part 104 does not restrict the secure communication in the secure domain in which no abnormality has occurred. In this case, similar to the sixth modified embodiment, secure communication in a secure domain in which no abnormality has occurred is continued.

According to the seventh modified embodiment, by allowing a user to select whether or not to restrict secure communication in a secure domain in which no abnormality has occurred among multiple secure domains, flexible communication according to the user becomes possible. For example, a user who prioritizes prevention of a malfunction can select to restrict secure communication, and a user who prioritizes production efficiency in a production system can select not to restrict secure communication.

Other Modified Embodiments

For example, the above-described modified embodiments may be combined.

For example, it is also possible that, in each transmission period, a communication period for each communication domain (D) is not set by time division, and the time division setting described in the embodiment is not performed. For example, it is also possible that, in the control system 1, instead of periodic communication, non-periodic communication in which a transmission period is not particularly defined is performed. For example, each of the functions may be realized by any device in the control system 1. Realization of some or all of the functions described as being realized by one industrial device 10 may be shared by multiple industrial devices 10.

International Publication No. 2017/046916 describes a technology for dynamically switching communication groups within a communication system within one transmission period by controlling ON/OFF of each of switches for causing one communication group to perform communication independently from other communication groups. Each of the communication groups includes a controller and an industrial device controlled by the controller.

A control system according to one aspect of the present invention includes: multiple communication domains set in the same industrial communication network; and multiple industrial devices, each of which belongs to at least one communication domain among the multiple communication domains and among which industrial devices belonging to the same communication domain communicate with each other. At least one industrial device among the multiple industrial devices includes: a storage part that stores domain information indicating whether or not the at least one communication domain to which the at least one industrial device belongs is a secure domain in which secure communication is performed; a security processing part that performs security processing related to the secure communication when the domain information indicates the secure domain; and a communication part that performs the secure communication based on the security processing.

According to an embodiment of the present invention, for example, an abnormality occurring in a network that supports multi-domain can be responded to.

Obviously, numerous modifications and variations of the present invention are possible in light of the above teachings. It is therefore to be understood that within the scope of the appended claims, the invention may be practiced otherwise than as specifically described herein.

The invention claimed is:

1. A control system, comprising:
   a plurality of industrial devices each belonging to at least one communication domain of a plurality of communication domains set in a same industrial communication network such that industrial devices belonging to a same communication domain communicate with each other, wherein a first industrial device of the plurality of industrial devices belongs to both a first communication domain and a second communication domain of the plurality of communication domains, and a second industrial device of the plurality of industrial devices belongs to the first communication domain and does not belong to the second communication domain of the plurality of communication domains, wherein at least one industrial device of the plurality of industrial devices includes processing circuitry configured to store domain information indicating whether or not the at least one communication domain to which the at least one industrial device belongs is a secure domain in which secure communication is performed, perform security processing related to the secure communication when the domain information indicates the secure domain, and perform the secure communication based on the security processing, and wherein the processing circuitry is configured to generate source data of data to be communicated independent of whether the data to be communicated is designated for communication in the secure domain.

2. The control system according to claim 1, wherein periodic communication is performed in each of the plurality of communication domains, and the processing circuitry is configured to periodically perform the secure communication.

3. The control system according to claim 1, wherein the second industrial device is controlled by the first industrial device, and each industrial device belonging to a secure domain includes the processing circuitry.

4. The control system according to claim 1, wherein all of the plurality of communication domains are secure domains.

5. The control system according to claim 1, wherein the plurality of communication domains includes a normal domain in which normal communication is performed.

6. The control system according to claim 5, wherein the processing circuitry is configured to perform the normal communication by transmitting data that has not been subjected to the security processing, when the domain information indicates the normal domain, and perform the secure communication by transmitting data that has been subjected to the security processing, when the domain information indicates the secure domain.

7. The control system according to claim 5, wherein the processing circuitry is configured to generate one set of data including both a first portion for the normal communication and a second portion for the secure communication as payloads, and perform the secure communication by transmitting the one set of data.

8. The control system according to claim 5, wherein the processing circuitry is configured to generate one set of data that does not include a portion for the normal communication as a payload and includes a portion for the secure communication as a payload, and perform the secure communication by transmitting the one set of data.

9. The control system according to claim 1, wherein the plurality of industrial devices includes a third industrial device belonging to the second communication domain and not to the first communication domain.

10. The control system according to claim 1, wherein the at least one industrial device belongs to multiple secure domains of the plurality of communication domains, and the processing circuitry is configured to, when an abnormality has occurred in one of the plurality of secure domains, restrict the secure communication in the secure domain in which the abnormality has occurred, and when the abnormality has occurred, restrict the secure communication in the secure domain in which the abnormality has not occurred.

11. The control system according to claim 1, wherein the at least one industrial device belongs to multiple secure domains of the plurality of communication domains, and the processing circuitry is configured to, when an abnormality has occurred in one of the plurality of secure domains, restrict the secure communication in the secure domain in which the abnormality has occurred, and continue the secure communication of the secure domain in which the abnormality has not occurred.

12. The control system according to claim 1, wherein the at least one industrial device belongs to multiple secure domains of the plurality of communication domains, and the processing circuitry is configured to receive a selection regarding whether or not to restrict the secure communication of the secure domain in which no abnormality has occurred and which is of the plurality of secure domains, when an abnormality has occurred in one of the plurality of secure domains, restrict the secure communication in the secure domain in which the abnormality has occurred, and when an abnormality has occurred and there is a selection to restrict secure communication in a secure domain in which no abnormality has occurred, restrict the secure communication in the secure domain in which no abnormality has occurred.

13. The control system according to claim 1, wherein the processing circuitry is configured to generate one set of data that includes a plurality of portions for secure communication as payloads and in which individual error detection codes are respectively set for the plurality of portions, and perform the secure communication by transmitting the one set of data.

14. The control system according to claim 1, wherein the first industrial device of the plurality of industrial devices is configured to communicate in either the first communication domain or the second communication domain of the plurality of communication domains after the processing circuitry generates the source data of data to be communicated.

15. An industrial device, comprising:

processing circuitry configured to perform security processing related to secure communication when domain information indicates a secure domain in which the secure communication is performed, and perform the secure communication based on the security processing, wherein the industrial device is one of a plurality of industrial devices each belonging to at least one communication domain of a plurality of communication domains set in a same industrial communication network such that industrial devices belonging to a same communication domain communicate with each other, a first industrial device of the plurality of industrial devices belongs to both a first communication domain and a second communication domain of the plurality of communication domains, a second industrial device of the plurality of industrial devices belongs to the first communication domain and does not belong to the second communication domain of the plurality of communication domains, and the domain information indicates whether or not the at least one communication domain to which the industrial device belongs is the secure domain, and wherein the processing circuitry is configured to generate source data of data to be communicated independent of whether the data to be communicated is designated for communication in the secure domain.

16. A method for controlling an industrial device, comprising:

generating source data of data to be communicated independent of whether the data to be communicated is designated for communication in a secure domain in which secure communication is performed;

performing security processing related to secure communication when domain information indicates the secure domain; and performing the secure communication based on the security processing, wherein the industrial device is one of a plurality of industrial devices each belonging to at least one communication domain of a plurality of communication domains set in a same industrial communication network such that industrial devices belonging to a same communication domain communicate with each other, a first industrial device of the plurality of industrial devices belongs to both a first communication domain and a second communication domain of the plurality of communication domains, a second industrial device of the plurality of industrial devices belongs to the first communication domain and does not belong to the second communication domain of the plurality of communication domains, and the domain information indicates whether or not the at least one communication domain to which the industrial device belongs is the secure domain.

17. The method according to claim 16, wherein the plurality of communication domains includes a normal domain in which normal communication is performed, and the method includes performing the normal communication by transmitting data that has not been subjected to the security processing when the domain information indicates the normal domain, performing the secure communication by transmitting data that has been subjected to the security processing when the domain information indicates the secure domain, generating one set of data including both a first portion for the normal communication and a second portion for the secure communication as payloads, and performing the secure communication by transmitting the one set of data.

18. The method according to claim 16, wherein the industrial device belongs to multiple secure domains of the plurality of communication domains, and the method includes, when an abnormality has occurred in one of the plurality of secure domains, restricting the secure communication in the secure domain in which the abnormality has occurred, and when the abnormality has occurred, restricting the secure communication in the secure domain in which the abnormality has not occurred.

19. The method according to claim 16, further comprising:

generating one set of data that includes a plurality of portions for secure communication as payloads and in which individual error detection codes are respectively set for the portions, and performing the secure communication by transmitting the one set of data.

20. A non-transitory computer-readable storage medium including computer executable instructions that, when executed by an industrial device of a plurality of industrial devices each belonging to at least one communication domain of a plurality of communication domains set in a same industrial communication network such that industrial devices belonging to a same communication domain communicate with each other, cause the industrial device to perform the method of claim 16.

*  *  *  *  *